United States Patent
Watts et al.

(10) Patent No.: US 7,460,658 B2
(45) Date of Patent: Dec. 2, 2008

(54) APPARATUS, AND AN ASSOCIATED METHOD, FOR SELECTABLY AND AUTOMATICALLY REDIRECTING A TELEPHONIC CALL TO A SECONDARY LOCATION

(75) Inventors: Ronald F. Watts, Lewisville, TX (US); Kenneth Depaul, Wake Forest, NC (US); Andrea Afkhami, Richardson, TX (US); Mike Thomason, Lafayette, CA (US); Gilman R. Steven, Fairview, TX (US)

(73) Assignee: Alcatel Lucent, Paris (FR)

( * ) Notice: Subject to any disclaimer, the term of this patent is extended or adjusted under 35 U.S.C. 154(b) by 1198 days.

(21) Appl. No.: 10/663,881

(22) Filed: Sep. 16, 2003

(65) Prior Publication Data

US 2005/0058269 A1    Mar. 17, 2005

(51) Int. Cl.
*H04M 3/42* (2006.01)

(52) U.S. Cl. .......................... 379/211.02; 379/221.09; 379/207.11; 370/352

(58) Field of Classification Search ............ 379/211.02, 379/221.09, 207.11; 370/352
See application file for complete search history.

(56) References Cited

U.S. PATENT DOCUMENTS

| | | | | |
|---|---|---|---|---|
| 5,185,786 A | * | 2/1993 | Zwick | 379/210.01 |
| 5,889,845 A | * | 3/1999 | Staples et al. | 379/211.02 |
| 6,282,281 B1 | | 8/2001 | Low | |
| 6,707,901 B1 | * | 3/2004 | Hodges et al. | 379/221.09 |
| 7,289,616 B2 | * | 10/2007 | Venkata et al. | 379/201.06 |
| 7,289,619 B2 | * | 10/2007 | Vivadelli et al. | 379/212.01 |

FOREIGN PATENT DOCUMENTS

| EP | 0 484 067 A2 | 5/1992 |
|---|---|---|
| EP | 0 959 593 A2 | 11/1999 |

OTHER PUBLICATIONS

Hubaux, et al.; The Impact of the Internet on Telecommunication Architectures; Computer Networks and ISDN Systems; Feb. 11, 1999; pp. 257-273; vol. 3, No. 3; North Holland Publishing; Amsterdam, NL.

Eckardt, et al.; A Personal Communication Support System Based on X.500 and X.700 Standards; Computer Communications; May 1997; pp. 145-156; vol. 20, No. 3; Elsevier Science Publishers BV; Amsterdam, NL.

* cited by examiner

*Primary Examiner*—Quynh H Nguyen

(57) ABSTRACT

Apparatus, and an associated method, for redirecting telephonic calls. Calls are directed to a user based upon the user's presence on a packet network. An indexer indexes together a forwarded call location together with dialing digits associated with a called location. When a calling party subsequently places a call to the called location, selected redirection of the call is effectuated pursuant to redirection procedures. A telephonic switch, through which the call placed by the calling party is routed, accesses the index formed by the indexer, located, for example, at a service control point. Responsive to the values contained in the index, the call is routed, to be delivered to the called party. In a work-from-home scenario, a TDM call placed to a worker's work location is redirected to a secondary location with the only effort required by the worker being his log on to the worker's corporate network.

20 Claims, 4 Drawing Sheets

APPARATUS, AND AN ASSOCIATED METHOD, FOR SELECTABLY AND AUTOMATICALLY REDIRECTING A TELEPHONIC CALL TO A SECONDARY LOCATION

The present invention relates generally to a manner by which selectably to redirect a call placed to a user by a calling party to deliver the call to a telephonic station positioned at a secondary location. More particularly, the present invention relates to an apparatus, and an associated method, by which automatically to direct incoming TDM calls to a user based upon user's presence on a packet network.

Automatic direction of the incoming calls is effectuated with little effort required of the user other than to log on to the packet network.

The user is able, e.g. to work at a remote location remote from the user's own work location. Calls placed by a calling party to the user's work location are automatically redirected to the remote location associated with the user's presence on the packet network.

BACKGROUND OF THE INVENTION

Telephonic communications through the use of telephonic networks is a necessary aspect of modern society. The need to communicate telephonically is a practical necessity for many. Public-access telephonic networks are widely deployed and regularly utilized by many through which to effectuate telephonic communications.

Many, if not most, modern telephonic networks permit the effectuation of both voice communication services and non-voice communication services therethrough. Interconnection of the telephonic networks deployed throughout widely disparate areas, when suitably interconnected theretogether, permits the effectuation of such communication services between almost any locations at which access to a telephonic network is available.

Users of a telephonic network communicate telephonically through the use of telephonic, or other, communication stations that are connected to the telephonic networks. Some telephonic stations are connectable to a telephonic network by way of a wireline connection, and other telephonic stations are connectable to a telephonic network by way of a radio air interface.

In most conventional telephonic networks, circuit-switched communication techniques are utilized. That is to say, call connections formed between telephonic stations connected to a conventional telephonic network utilize circuit-switched connections. When a circuit-switched connection is formed, a circuit-switched channel, a dedicated channel, is dedicated to the telephonic stations for the duration of a communication session during which to effectuate the communication service. By providing the dedicated channel, a connection is maintained between the telephonic stations during the communication session, irrespective of whether data is more than just intermittently communicated therebetween. During times in which data is not communicated between the telephonic stations, the communication capacity dedicated thereto by the circuit-switched connection is not fully utilized. And, as a result, the communication capacity of a communication system in which circuit-switched connections are formed between telephonic stations pursuant to effectuation of a telephonic communication service are prone to underutilizing the communication capacity of the communication channels formed by the circuit-switched connections. In other words, inefficient utilization of the communication capacity of a telephonic network results.

Telephonic, and other communication, networks that utilize shared-channel communication techniques are better able efficiently to utilize the available communication capacity thereof. Packet-based communication schemes, for instance, utilize packet-switched connections permitting shared channels to be used upon which to communicate data. Packet-formatted data is formed of discrete packets, the communication of which is permitted at discrete intervals. The same channel that is used to communicate data packets in a communication session between a first set of telephonic stations is used to communicate data packets communicated between another set of telephonic stations pursuant to another communication session. A two-fold, or greater, increase in the communication capacity of a communication system that utilizes packet-switched connections, or other shared channels, is possible. And, in contrast to conventional, circuit-switched communication techniques, a telephonic network that utilizes packet-switched communication techniques are able more efficiently to utilize the communication capacity allocated to a communication system.

The packet-formatted data is formatted according to a standardized packet-formatting standard. Various packet formatting protocols have been promulgated and standardized. An IP protocol (Internet Protocol) is an exemplary packet formatting protocol that is widely utilized. Communication devices operable to send and to receive IP-formatted data, when suitably connected theretogether by way of a communication network, form communication stations capable of communicating the IP formatted data therebetween.

The Internet backbone is perhaps the most widely utilized packet data network, and to which communication devices of many types are regularly connected through which to communicate data pursuant to effectuation of a communication service. Access to the Internet backbone to permit sending and receiving of data thereon is also becoming a practical necessity of modern society. At many business establishments, workers are provided with both Internet access and conventional, telephonic service. For many work functions, access to both telephonic communications and to the Internet is required.

Increasingly, workers sometimes work at a location remote from the worker's normal office. A worker might, for instance, work from home or work from a travel destination. And, when working from home or the travel destination, or elsewhere, access both to telephonic service and to the Internet is also regularly available.

A worker, using a workstation connected at any location to the Internet backbone is able, generally, to receive data communicated thereto, such as by way of a virtual private network or a store-and-forward entity. However, routing of calls to a telephonic station positioned at the worker's location is not so easily completed.

Call forwarding of phone calls is available to forward calls placed to a particular telephonic station to another telephonic station. However, call forwarding used by many office locations is provided by a local PBX (private branch exchange) switch. That is to say, call forwarding is provided by the PBX switch associated with the telephonic station of the worker's work location. The PBX switch is programmed to route calls placed to the worker's telephonic station to an alternate telephonic station. The programming of the call forwarding is generally required to be performed at the phone whose calls are being forwarded. The call forwarding generally can not be done from a remote location. And, trunk-in and trunk-out lines are required to route a single call to the desired telephonic station. That is to say, a call forwarded by the PBX switch requires the call first to be received at the PBX switch, the trunk-in line, and then a new call is generated to the desired telephonic station, using a trunk-out line.

Conventional call forwarding schemes also exhibit other problems. Setting up the call forwarding must be a conscious effort, requiring active steps by one to enter the programming commands, separate from log in operations to a corporate network. A remote working scenario requires separate active steps. Additionally, there is sometimes no way remotely to defeat the call forwarding feature. That is, call forwarding sometimes can not be terminated but through subsequent call forwarding programming at the phone whose calls are being forwarded. And, voice mail generated while the worker is using the telephonic station at the desired, i.e., non-work, location instead is delivered to the voice mail of the telephonic station at the office location. A complex remote access methodology is required to access the voice mail, and no notification is provided to the worker at the remote location that the voice mail message is received.

So-called find-me/follow-me services are sometimes also available. These services also exhibit various drawbacks. Network traffic, for instance, is generated while the service calls one number, then another, then another. And, a caller is sometimes required to wait for extended time periods while successive routes time out and others are tried. Additionally, a conscious, active user input is required to set up the following criteria as well as to change the following criteria.

Conventional call-forwarding techniques exhibit various disadvantageous that limit their usefulness to a worker working from a remote location.

An improved manner by which to redirect calls placed in a telephonic network that overcomes the disadvantages associated with existing manners would therefore be advantageous.

It is in light of this background information related to call redirection in a telephonic network that the significant improvements of the present invention have evolved.

SUMMARY OF THE INVENTION

The present invention, accordingly, advantageously provides an apparatus, and an associated method, by which selectably and automatically to redirect a call placed to a user by a calling party to deliver the call to a telephonic station positioned at a secondary location.

Through operation of an embodiment of the present invention, a manner is provided by which automatically to direct an incoming call to a user based upon the user's presence on a packet network.

The user logs on to the packet network. And, automatic direction of the incoming calls is then effectuated to the location dependent upon the user's log on presence in the packet network.

When the user is a corporate, or other, employee and has a regular work location, operation of an embodiment of the present invention provides a convenient manner to facilitate the user working from a remote location, such as in a work-from-home scenario. The user logs on a corporate network, e.g. a VPN. By logging on, the user identifies the user's remote location and a telephone number associated with the remote location. Calls are automatically directed to the identified telephone number.

In another aspect of the present invention, call redirection, or forwarding, is performed to redirect the call to the telephonic station at the user-selected location without requiring forwarding instructions to be entered at the telephonic station, of which calls thereto are to be forwarded. The instructions, instead, are able to be entered remotely. The instructions are entered, for instance, at a work station connected to the Internet, or other packet-based network. Subsequent to entry of the instructions, automatic redirection of any call subsequently entered by a calling party, placed to the telephonic station, is redirected, according to the instructions.

Redirection of the call also reduces network traffic in a telephonic network relative to conventional call forwarding procedures. Call redirection takes place at a telephonic switch in a telephonic network, not at a PBX (private branch exchange) or the calling station. Separate trunk-in and trunk-out lines otherwise conventionally required to be utilized to complete the call forwarding is obviated. That is to say, a call placed by a calling party to a called station is redirected early in the call routing of the call rather than delivery to the called station, or its associated PBX switch. Redirection is performed at the telephonic switch. A trunk-in line extending between the telephonic switch and the called station, or its associated PBX, and a corresponding trunk-out line from the called station to the forwarded station are both obviated. Network resources required to redirect the call are thereby reduced relative to conventional techniques.

A worker, or other user, is more easily and more efficiently able to cause call redirection of calls from a work location to a remote location, such as a work-at-home location. The remote location is a location at which the worker has access to the Internet, or other packet data network, and a computer work station, or other packet data communication station connected thereto. By way of such equipment, the worker logs in to a workplace network, such as a virtual private network. During the log in procedure, or subsequent thereto, the worker identifies a forwarded telephonic station, such by its dialing code, to which telephonic calls placed to the worker's workplace telephonic station are to be redirected. This information forms redirection information that is subsequently used when a calling party places a call to the worker's workplace telephonic station to redirect the call to the forwarded telephonic station.

In another aspect of the present invention, the redirection information of the dialing code of the forwarded telephonic station is provided by the workplace network to a service control point. The service control point is accessible by a telephonic switch of the telephonic network through which calls are routed upon placement by a calling party. And, more particularly, the service control point, and the redirection information maintained thereto, is accessible by a telephonic switch that forms part of the first telephonic network. When a call is placed to the called station, i.e., the worker's workplace location, the call is routed to a telephonic switch. And, the telephonic switch accesses the redirection information maintained at the service control point. The information is provided to the telephonic switch entity. And, responsive to the information, the telephonic switch redirects the call, if appropriate, to the forwarded telephonic station identified by the redirection information. Redirection information is updated, as appropriate, when the worker moves to another location, such as another remote location or back to the workplace location.

The redirection information, in one implementation, is entered automatically, pursuant to log in procedures by a worker. In another implementation, the user provides the redirection information subsequent to completion of the log in procedures. Additionally, in another implementation, when the worker logs out of the workplace network, redirection information redirects a call placed to the called telephonic station to a voice mail address, subsequently accessible to the worker.

Thereby, a manner is provided by which calls are directed to a worker's current location based upon the network status of the worker. That is to say, the worker is alternately logged in locally, logged in remotely, or not logged in. In contrast to conventional call forwarding from a PBX, calls from outside of a PBX are directed to the current location of the worker and do not tie up network facilities at the PBX or abnormally within the PSTN. That is to say, no "tromboning" occurs. Also, voice mail is redirected to the local phone of the worker or to a special mailbox, such as voice e-mail.

Call redirection is automatic, in one implementation, together with network log in of the worker at the workplace network. If the workers logs in from the work location, the network server notifies the service control point of this log in. And, calls are directed to the telephonic station positioned at the workplace location. If the worker logs in from a remote location, the service control point is notified of this log in. And, calls are directed to the remote location telephonic location. If the worker logs in from the remote location, the worker can be prompted at log in with a service profile screen that permits the worker to decide in what manner to handle incoming calls.

A calling party need not be aware that the worker is not at the workplace location and need not be aware of the dialing digits associated with the forwarded call station. Only a single telephone number is required to be known to call the worker, and calls are automatically redirected as appropriate to the log in and work status. Multiple routes are not required, and forwarding from one phone to another upon time outs is not required. Additionally, excessive network activity is not required to route a call to the worker, and the current location of the worker is identified immediately, without multiple legs between switches.

In these and other aspects, therefore, apparatus, and an associated method, is provided for a communication system. The communication system has a packet data network through which a user selectably communicates at any of a first location and at least a second location. And, the system includes a first telephonic network through which the user also selectably communicates, also at any of the first and at least second locations. Routing of a call to the user placed by a calling party by way of the first telephonic network to a user, located at a selected one of the first location and the at least second location, is facilitated. A detector is embodied at the packet data network and is adapted to receive indications provided to the packet data network of at which of the first and at least second locations at which the user selects to communicate by way of the first telephonic network. An indexer is coupled to the detector. The indexer forms an index by indexing together values representative of selection made by the user of the selected one of the first and the at least second locations together with calling indicia used to route the call to the selected one of the first location and the at least the second location.

A more complete appreciation of the present invention and the scope thereof can be obtained from the accompanying drawings that are briefly summarized below, the following detailed description of the presently preferred embodiments of the invention, and the appended claims.

DETAILED DESCRIPTION

Figure 1:
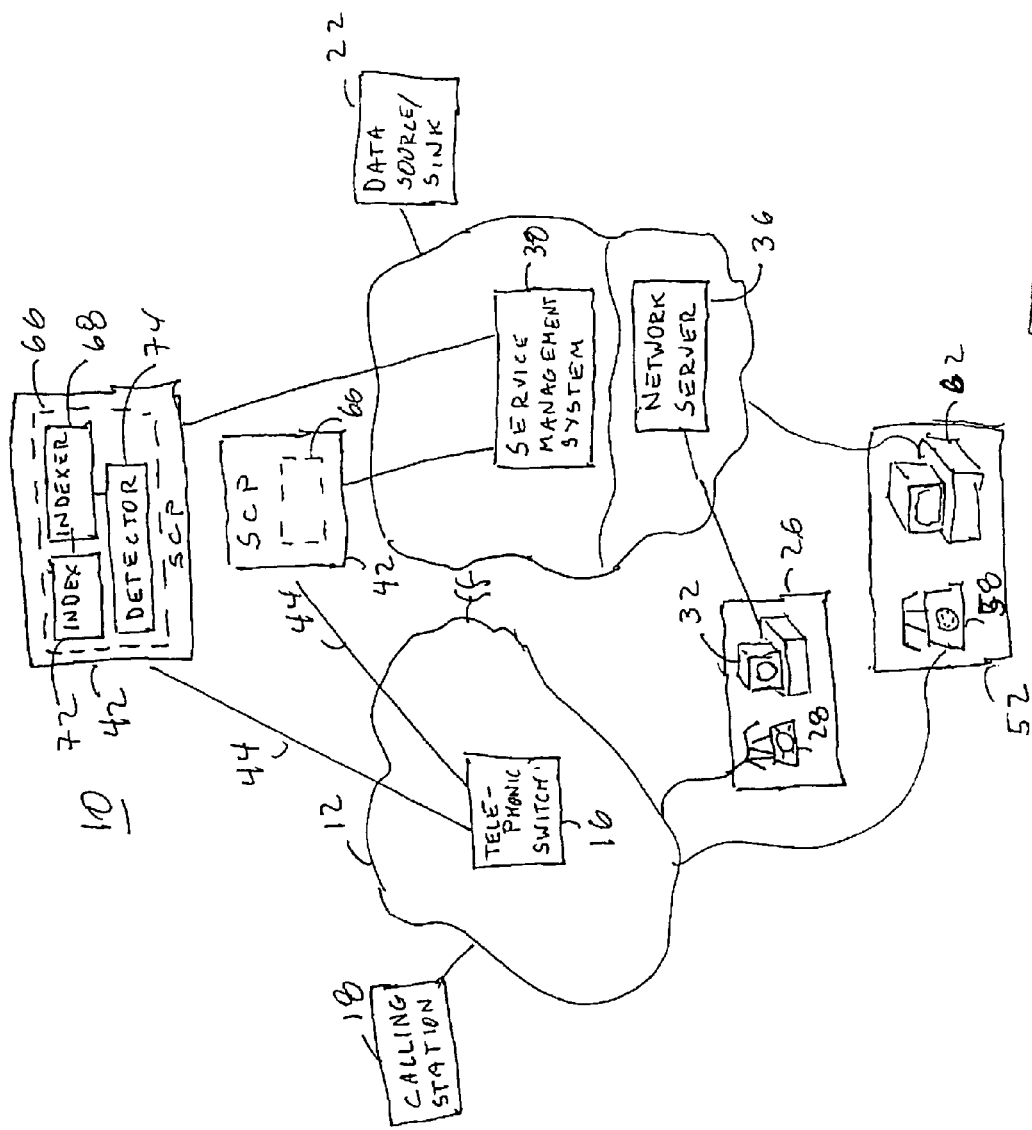
FIG. 1 illustrates a functional block diagram of a communication network in which an embodiment of the present invention is operable.

Referring first to FIG. 1, a communication network, shown generally at 10, provides for communication of both voice and non-voice data. The communication network here includes a time division multiplexed (TDM) network 12, such as a public switched telephonic network (PSTN). And, the communication network includes a packet data network 14, here the Internet backbone and a private packet data network connected thereto.

The TDM network forms a communication fabric through which circuit-switched connections are formed and through which telephonic communication services are effectuated. And, the packet data network forms a communication fabric through which packet-switched connections are formed. Packet formatted data is communicated through the packet data network, also to effectuate communication services.

The TDM network 12 includes a telephonic switch 16 through which call connections are routed between a call placed by a calling party at a calling station and a called party at a called station. The calling station 18 is representative of a calling station at which a calling party can initiate a call to a called station. A call is initiated, in conventional manner, through entry thereat of dialing codes, i.e., telephone numbers that identify the called party. When placed, the call is routed by the telephonic switch 16 to an appropriate destination.

A data source and sink 22 is connected to the packet data network and is representative of an exemplary data source, such as a data server, the originates data that is communicated pursuant to effectuation of a packet communication service. Other devices are analogously also connected to the packet data network.

Communication devices operable in conjunction with the separate networks 12 and 14 are positioned together at a first location, shown at 26. That is to say, a telephonic station 28 and a computer work station 32, or other packet-data communication device, are located together at the first location. The telephonic station 28 is connected to the TDM network 12, and the work station 32 is connected to the packet data network 14. Normal telephonic communications are effectuable by way of the telephonic station 28, and normal internet-related, or other packet data network-related, communications are effectuated through use of the computer work station.

The packet data network includes various functional entities. A network server 36, functioning, amongst other things, as a network log in server, is embodied at the corporate network portion of the packet data network. And, a service management system 38 is embodied at the Internet backbone portion of the packet data network. And, various service control points (SCPs) 42 are also embodied at the Internet backbone portion of the packet data network. Selected access to the service control point is available to other entities of the packet data network. And, selected access to the service control points is also provided to the telephonic switch 16 of the TDM network. Here, such access is indicated by way of the lines 44.

A second location, shown at 52, is also representative of a location at which access to the telephonic network 12 and access to the packet data network 14 is available. A telephonic station 58 and computer work station 62 are representatives of communication devices connected to the respective networks 12 and 14. The telephonic station 58 operates in manners analogous to that of the telephonic station 28. And, the computer work station 62 operates in manners analogous to operation of the computer work station 32.

While the first and second locations 26 and 52 are representative of any locations, here, for purposes of describing operation of an embodiment of the present invention, the first location forms a work location at which a worker is normally located. And, the location 52 represents a remote location, remote from the normal work location of the worker. When the worker is positioned at the first location, the worker, in normal manner, makes use of the computer work station 32 and the telephonic station 28. And, when the worker is positioned at the remote location 52, the worker is able, in conventional manner, to make use of the telephonic station 58 and the computer work station 62.

A calling party, such as a calling party located at the telephonic station 18 is, however, not necessarily aware of the location at which the worker is located. While the worker might usually be located at the work location 26, the worker might, instead, be at the remote location 52. A call placed to the worker, in this scenario, would be placed to the telephonic station 28. If the worker is, instead, located at the remote location 52, the worker would not receive the call.

Conventional call forwarding techniques usually are effectuated at the telephonic station that is to be forwarded or at a PBX associated therewith. Here, for instance, to effectuate call forwarding, the call forwarding instructions would have to be entered at the telephonic station 28 to forward subsequent calls to the telephonic station 58. And, in any event, call forwarding would be effectuated close to the telephonic station, i.e., at the PBX associated therewith.

Operation of an embodiment of the present invention, in contrast, provides a manner by which to redirect calls more efficiently without necessitating that forwarding instructions be entered at the telephonic station 28.

And, more particularly, operation of an embodiment of the present invention automatically directs a TDM call to the worker based upon the worker's presence in the packet data network. Apparatus 66 of an embodiment of the present invention is embodied at a service control point 42. The apparatus is functionally represented and is implemented in any desired manner, such as through the use of algorithms executable at processing circuitry. Such apparatus is embodied at any one, or more, of the service control points.

The apparatus 66 is here shown to include an indexer 68 that forms an index 72. The index formed by the indexer is accessible by the telephonic switch 16 during call routing operations. The apparatus further includes a detector 74 that detects instructions entered by the worker at a computer work station as to the telephonic identity of to where calls placed to the worker should be routed.

That is to say, when the worker is positioned at the remote location, the worker logs in to the corporate network by way of the computer work station 62 and enters, or has automatically entered, the dialing digits associated with the telephonic station 58. The values of the telephonic dialing digits are routed through the packet data network and detected by the detector 74. The detected values are provided to the indexer and the indexer indexes such values at the index 72. The values are subsequently accessed when a call is placed to the telephonic station 28. When the dialing digits, forming redirection information, is maintained at the index 72, indexed together with the dialing digits associated with the telephonic station 28, the telephonic switch redirects the call to the telephonic station 58. Thereby, the call is placed to the worker at the remote location 52.

If the worker later departs from the remote location and moves to another, analogous location, the worker's new location at which calls are to be redirected is updated to the indexer in analogous manner. And, if, for instance, the worker returns to the normally used location, an update is provided, also in like manner, to redirect the calls back to the telephonic station 28. That is to say, when the worker-returns to the location 26 and logs in thereat, the worker cancels the call redirection to a remote location and subsequent calls placed to the worker are routed to the telephonic station 28.

Figure 2:
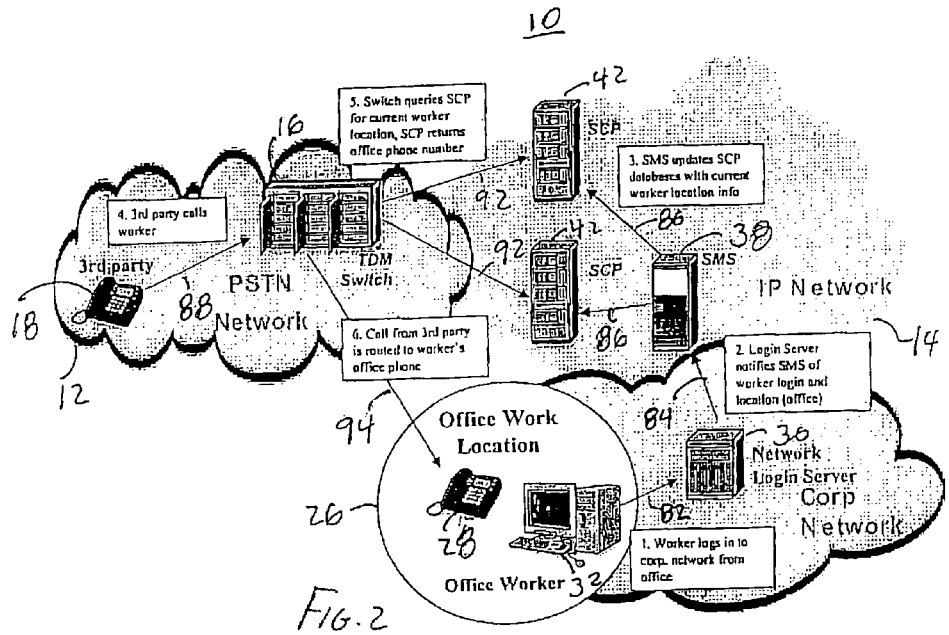
FIG. 2 illustrates a functional representation of a first operating scenario and the sequence of signaling generated therein during operation of an embodiment of the present invention.

FIG. 2 illustrates again the communication network 10. Here, operation of an embodiment of the present invention, when the worker is positioned at the normally used location 26, is represented. The normally used location is here the office location of the worker. The worker logs in, indicated by the segment 82, to the network server 36. The network server recognizes the log in of the worker. And, in turn, the network server sends a message, indicated by the segment 84, to the service management system 38. The service management system, in turn, updates, indicated by the segments 86, the service control points 42 and apparatus 66 embodied thereat.

Thereafter, when a call is placed, indicated by the segment 88, by a calling party, here the calling party 18, the call is routed, in conventional manner, first to the switch element 16. Here, the switch element inquires of one or more of the service control points to ascertain to where to route the call placed by the calling party. The inquiries are indicated by the segments 92. And, the information is returned to the switch. Then, the switch routes the call, here indicated by the segment 94, to the telephonic station 26, located at the work location 26.

And, more particularly, calls to the worker placed from outside sources within the TDM/PSTN network generate SS7 queries to the service control points 42. The service control points 42 respond with the office number of the worker that is indexed by the indexer 68 and maintained at the index 72 thereof. Additionally, when the worker is no longer logged in to the network server, calls that are placed to the telephonic station 28 are instead routed to a voice mail service of the worker, the worker's mobile phone, another worker, or any other desired location. Upon log off from the computer work station 32, updated information is sent to the service management system that, in turn, updates the apparatus embodied at the service control point. The updated information is based, for instance, on the worker's profile that indicates to where calls are to be routed when the worker is logged off but logged in elsewhere.

Figure 3:
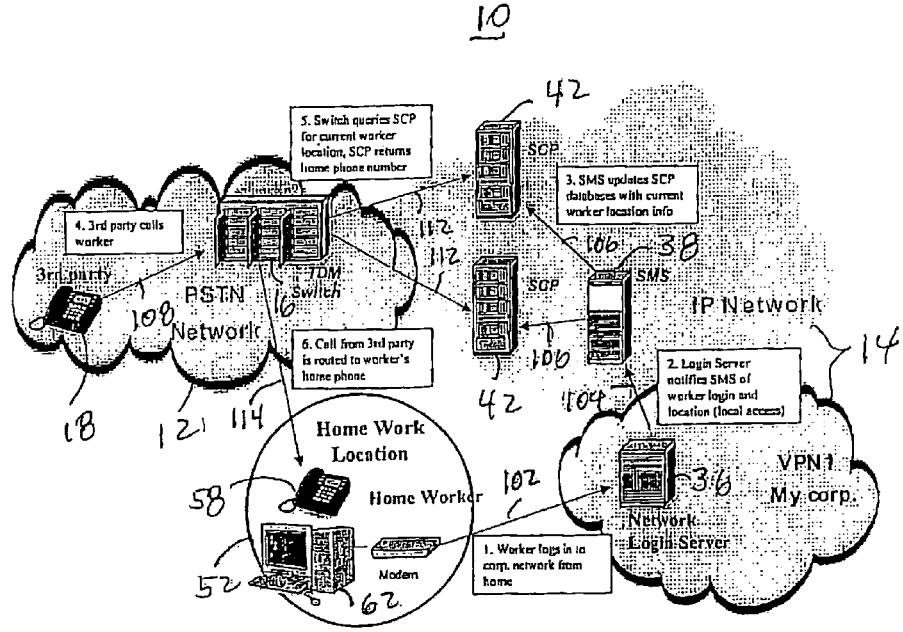
FIG. 3 illustrates a representation, similar to that shown in FIG. 2, but of a second operating scenario and the sequence of signaling generated therein during operation of an embodiment of the present invention.

FIG. 3 again illustrates the communication network 10, here illustrating a scenario in which the worker is working from a remote location, here at the worker's home in a work at a work-at-home scenario. The worker logs on, indicated by the segment 102, to the network server 36. Responsive to the log in of the worker, the network server updates, indicated by the segment 104, the service management system 38 to notify the service management system of the remote log in. The message forwarded by the server 36 to the system 38 utilizes, e.g., standard protocols. The service management system, in turn, updates, indicated by the segments 106, the apparatus 66 embodied at the one or more service control points 42. The detector of the apparatus detects the message and provides indications of the detections to the indexer. The indexer forms an index that is later accessed during call routing procedures. The current location of the worker is thereby maintained at the index at least at one of the service control points.

A call subsequently placed by the calling party 18 is routed, indicated by the segment 108, to the telephonic switch 16. The telephonic switch ascertains, indicated by the segments 112, the updated location of the worker. The information is returned to the telephonic switch, and the telephonic switch routes the call, indicated by the segment 114, to the telephonic station 58 at the remote location 52. And, in particular, the telephonic switch generates an SS7 query to the service control point 42, and the service control point responds with the home phone number of the worker. Calls are routed to the home office of the worker thereby. If the worker disconnects from the network, the network log in server 36 again sends updated status information to the service management system that will update the service control points based upon the desired profile of the worker. Calls are then diverted, e.g., to another worker, the voice mail of the worker, or some other routing, as desired.

Figure 4:
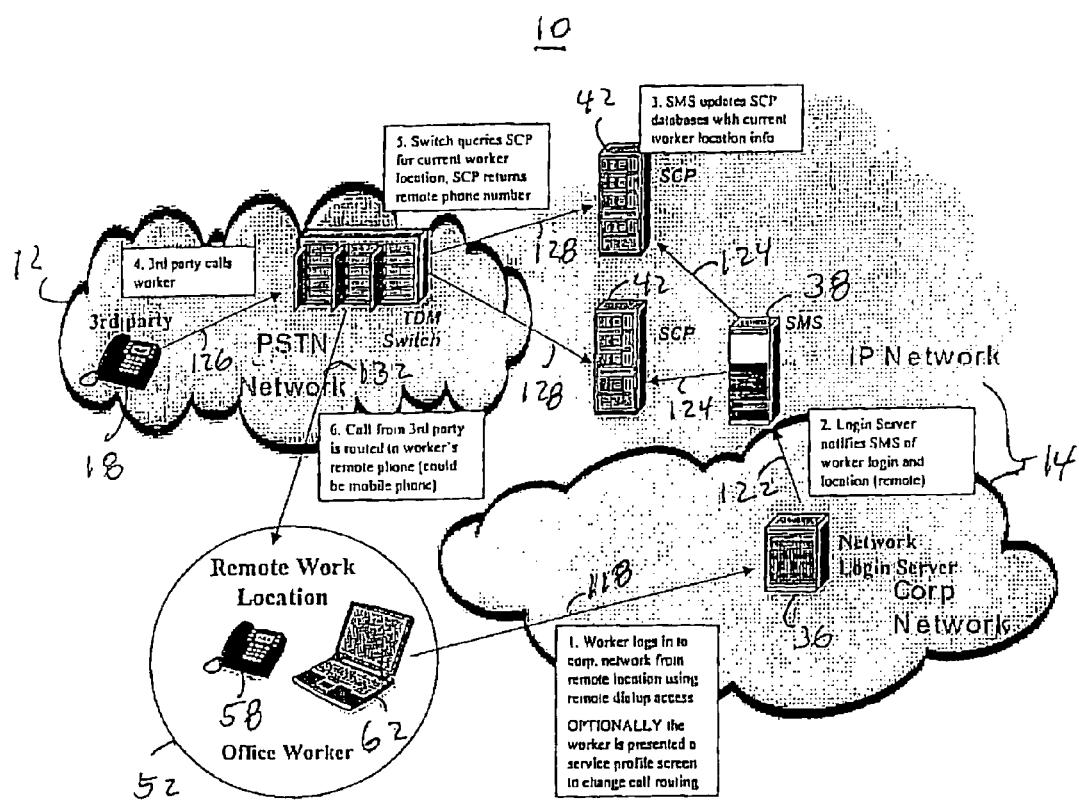
FIG. 4 illustrates a representation, similar to those shown in FIGS. 2-3, but of a third operating scenario and the sequence of signaling generated therein during operation of an embodiment of the present invention.

FIG. 4 again illustrates the communication network and exemplary operation therein. Here, the location 52 is representative of a remote work location, such as a traveled-to destination. The worker utilizes a computer work station 62 to access, indicated by the segment 118, the network server 36. Access is made, for instance, by a local network access network or a dial-up line. Optionally, during the log in procedures, the worker is presented with a service profile screen permitting the worker to modify call delivery thereto. The corporate network server uses a standard protocol to communicate, indicated by the segment 122, the registration of the worker to the service management system 38. The service management system, in turn, updates, indicated by the segments 124, the updated information.

Subsequently, when a calling party at the calling station 18 initiates a call, indicated by the segment 126, the telephonic switch 16 ascertains the desired dialing code to which to route the call. Inquiries are made, indicated by the segments 128, of at least one of the service control points, and, once the information is obtained, the call is routed, indicated by the segment 132, to the telephonic station 58. Again, subsequent to worker log off of the work station 62, calls are re-routed, based upon the worker's profile.

In each of these scenarios, calls from co-workers, normally on the same PBX as the worker, reach the worker based upon certain configuration parameters. For instance, the worker is assigned with a universal number that falls outside of the dialing plan of the office PBX. This way, all calls from co-workers will go to a local SSP that must query the SCP for current location information. Or, the worker is on a Centrex™ system that has AIN capabilities. The number of the worker is set up for a dialed digits trigger that queries the SCP for the current location of the worker each time in which the number is dialed. Or, e.g., the worker is on a next-generation (NG) network, IP PBX or IP Centrex, and the SIP phone used by the worker, that is a soft phone on the work station, registers normally once the worker has logged on to the network and calls are redirected by the PBX or Centrex to the worker by way of VoIP.

Figure 5:
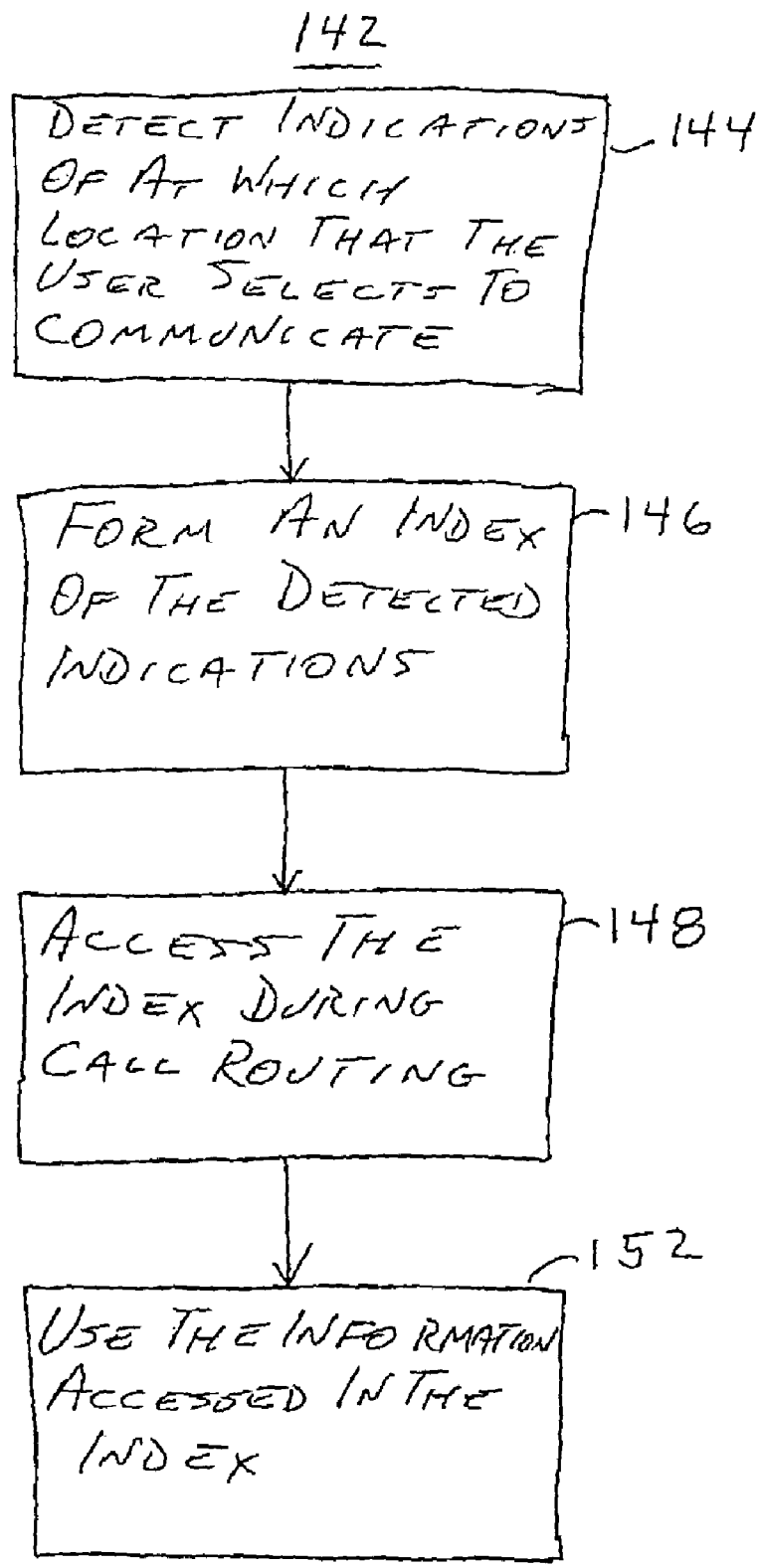
FIG. 5 illustrates a method flow diagram listing the method steps of the method of operation of an embodiment of the present invention.

FIG. 5 illustrates a method, shown generally at 142, of an embodiment of the present invention. The method facilitates routing of a call to a user placed by a calling party by way of a first telephonic network to a user located at a selected one of a first location and at least a second location.

First, and as indicated by the block 144, indications are detected at the packet data network of at which of the first and at least second locations at which the user selects to communicate by way of the first telephonic network. Then, and as indicated by the block 146, an index is formed. The index is formed by indexing together values representative of selection made by the user of the selected one of the first and at least second locations together with calling indicia used to route the call to the selected one of the first location and the at least the second location.

Thereafter, and as indicated by the block 148, the index that is formed is accessed when routing the call to the user placed by the calling party. And, as indicated by the block 152, the information that is accessed is used to complete the routing of the call.

Thereby, a manner is provided by which better to redirect calls placed by a calling party to a location at which a receiving party is positioned. Call redirection is effectuated at a telephonic switch in a telephonic network rather than subsequent to routing all the way through the telephonic network to a location, or area, proximate to the called station. Thereby, communication resources are conserved.

The previous descriptions are of preferred examples for implementing the invention, and the scope of the invention should not necessarily be limited by this description. The scope of the present invention is defined by the following claims:

We claim:

1. In a communication system having a packet data network through which a user selectably communicates at any of a first location and at least a second location and a first telephonic network through which the user also selectably communicates, also at any of the first and at least second locations, respectively, an improvement of apparatus for facilitating routing of a call to the user placed by a calling party by way of the first telephonic network to a user located at a selected one of the first location and the at least the second location, said apparatus comprising:
   a detector embodied at the packet data network and adapted to receive indications provided to the packet data network of at which of the first and at least second locations at which the user selects to communicate by way of the first telephonic network; and
   an indexer coupled to said detector, said indexer for forming an index by indexing together values representative of selection made by the user of the selected one of the first and at least second locations together with calling indicia used to route the call to the selected one of the first location and the at least the second location.

2. The apparatus of claim 1 wherein a packet communication station is positioned at least at the selected one of the first and at least second locations and coupled in communication connectivity with the packet data network and wherein the indications provided to the packet data network and detected by said detector are provided by the user through operation of the packet communication station.

3. The apparatus of claim 2 wherein said detector further detects indications of the calling indicia that is indexed together by said indexer with the values representative of the selection made by said indexer.

4. The apparatus of claim 3 wherein the indications of the calling indicia are provided to the packet data network and are provided by the user through operation of the packet communication station.

5. The apparatus of claim 1 wherein a telephonic-network communication station is positioned at least at the selected one of the first and at least second locations and coupled in communication connectivity with the first telephonic network, the telephonic-network communication station identified by a calling code and wherein the calling indicia indexed together by said indexer comprises the calling code identifying the telephonic-network communication station.

6. The apparatus of claim 1 wherein said indexer is coupled to the first telephonic network and the index is accessible therefrom when the calling party places the call to the user.

7. The apparatus of claim 6 wherein the user is associated with a normally-called location, the normally-called location having a normally-called telephonic station associated therewith, and wherein said indexer further indexes the values representative of the normally-called location together with the values representative of the selection made by the user.

8. The apparatus of claim 7 wherein the normally-called location has a normally-called-location dialing code associated therewith and wherein the values representative of the normally-called location indexed by said indexer comprise the normally-called-location dialing code.

9. The apparatus of claim 8 wherein the call placed by the calling party is initiated through entry of the normally-called-location dialing code, and wherein said indexer is accessed pursuant to the routing of the call to ascertain the calling indicia used to route the call to the selected one of the first location and the at least the second location.

10. The apparatus of claim 1 wherein the communication system comprises a Service Control Point (SCP) and wherein said indexer is embodied thereat.

11. The apparatus corn claim 1 wherein the packet data network comprises a private network portion and wherein said detector is embodied thereat.

12. The apparatus of claim 1 wherein the packet data network comprises a public. network portion and wherein said detector is embodied thereat.

13. In a method of communicating in a communication system having a packet data network through which a user selectably communicates at any of a first location and at least a second location and a first telephonic network through which the user also selectably communicates, also at any of the first and at least second locations, respectively, an improvement of a method for facilitating routing of a call to the user placed by a calling party by way of the first telephonic network to a user located at a selected one of the first location and the at least the second location, said method comprising:

detecting, at the packet data network, indications provided to the packet data network of at which of the first and at least second locations at which the user selects to communicate by way of the first telephonic network;

forming an index by indexing together values representative of selection made by the user of the selected one of the first and at least second locations together with calling indicia used to route the call to the selected one of the first location and the at least the second location;

accessing the index formed during said operation of forming the index when routing the call to the user placed by the calling party; and using information accessed during said operation of accessing to complete the routing of the call.

14. The method of claim 13 wherein a packet communication station is positioned at least at the selected one of the first and at least second locations and is coupled in communication connectivity with the packet data network and wherein said method further comprises the operation of providing, by the user, through operation of the packet communication station, the indications provided to the packet data network of at which of the first and at least second locations at which the user selects to communicate.

15. The method of claim 14 wherein said operation of providing further comprises providing the indications of the calling indicia to the packet data network through operation of the packet communication station.

16. The method of claim 13 wherein the user is associated with a normally-called location, the normally-called location having a normally called telephonic station associated therewith, and wherein said operation of indexing further comprises indexing the values representative of the normally-called location together with values representative of the normally-called location together with values representative of the selection made by the user.

17. The method of claim 16 further comprising the operation, prior to said operation of accessing, of placing the call by the calling party.

18. The method of claim 17 wherein the values representative of the normally-called location comprise a normally-called telephonic dialing code, and wherein said operation of placing the call comprises entering the normally-called telephonic dialing code.

19. The method of claim 18 wherein a telephonic-network communication station is positioned at least at the selected one of the first and at least second locations and coupled in communication connectivity with the first telephonic network, the telephonic network communication station identified by a calling code and wherein said operation of indexing indexes together the calling code and the normally-called telephonic dialing code.

20. The method of claim 13 wherein the index fanned during said operation of indexing is embodied at a Service Control Point, the Service Control Point Accessible from the first telephonic network.

* * * * *